(12) United States Patent
Armijo et al.

(10) Patent No.: US 11,911,958 B2
(45) Date of Patent: Feb. 27, 2024

(54) METHOD AND APPARATUS FOR ADDITIVE MANUFACTURING WITH PREHEAT

(71) Applicant: Stratasys, Inc., Eden Prairie, MN (US)

(72) Inventors: Armando Armijo, San Diego, CA (US); Riley Reese, Amsterdam (NL)

(73) Assignee: Stratasys, Inc., Eden Prairie, MN (US)

( * ) Notice: Subject to any disclaimer, the term of this patent is extended or adjusted under 35 U.S.C. 154(b) by 468 days.

(21) Appl. No.: 15/587,292

(22) Filed: May 4, 2017

(65) Prior Publication Data

US 2018/0319098 A1 Nov. 8, 2018

(51) Int. Cl.
| | |
|---|---|
| *B29C 64/153* | (2017.01) |
| *B29C 64/20* | (2017.01) |
| *B29C 35/02* | (2006.01) |
| *B33Y 10/00* | (2015.01) |
| *B33Y 30/00* | (2015.01) |
| *B29B 13/02* | (2006.01) |
| *B29B 13/08* | (2006.01) |
| *B29C 35/08* | (2006.01) |
| *B29C 64/106* | (2017.01) |
| *B29C 35/04* | (2006.01) |

(52) U.S. Cl.
CPC ............ *B29C 64/153* (2017.08); *B29B 13/02* (2013.01); *B29B 13/08* (2013.01); *B29C 64/106* (2017.08); *B29C 64/20* (2017.08); *B33Y 10/00* (2014.12); *B33Y 30/00* (2014.12); *B29C 35/0261* (2013.01); *B29C 2035/0283* (2013.01); *B29C 2035/046* (2013.01); *B29C 2035/0822* (2013.01); *B29C 2035/0838* (2013.01); *B29C 2035/0855* (2013.01); *B29C 2035/0872* (2013.01); *B29C 2035/0877* (2013.01)

(58) Field of Classification Search
CPC .................................................... B29C 64/295
See application file for complete search history.

(56) References Cited

U.S. PATENT DOCUMENTS

| | | |
|---|---|---|
| 5,121,329 A | 6/1992 | Crump |
| 5,578,227 A | 11/1996 | Rabinovich |
| 6,004,124 A | 12/1999 | Swanson et al. |
| 6,054,077 A | 4/2000 | Comb et al. |
| 6,391,251 B1 | 5/2002 | Keicher et al. |

(Continued)

FOREIGN PATENT DOCUMENTS

| | | |
|---|---|---|
| EP | 3045992 A1 | 7/2016 |
| EP | 3051445 A1 | 8/2016 |

(Continued)

OTHER PUBLICATIONS

Polymer Science Learning Center, "The Glass Transition", 2014 (Year: 2014).*

(Continued)

*Primary Examiner* — Alison L Hindenlang
*Assistant Examiner* — Andres E. Behrens, Jr.
(74) *Attorney, Agent, or Firm* — Westman, Champlin & Koehler, P.A.

(57) ABSTRACT

A polymeric material used for 3D printing is preheated, at a first zone in a 3D printer, to a temperature in excess of its glass transition temperature prior to being melted, at a second zone, for incorporation into a build object. This enables the polymer to be processed more rapidly than in the prior art.

14 Claims, 8 Drawing Sheets

(56) References Cited

U.S. PATENT DOCUMENTS

| | | |
|---|---|---|
| 6,441,342 B1 | 8/2002 | Hsu |
| 7,024,272 B2 | 4/2006 | Thomas et al. |
| 7,483,818 B2 | 1/2009 | Amakai et al. |
| 7,896,209 B2 | 3/2011 | Batchelder et al. |
| 7,897,074 B2 | 3/2011 | Batchelder et al. |
| 8,308,876 B2 | 11/2012 | Woods et al. |
| 8,465,111 B2 | 6/2013 | Swanson et al. |
| 8,647,102 B2 | 2/2014 | Swanson et al. |
| 8,808,603 B2 | 8/2014 | Swanson |
| 8,920,697 B2 | 12/2014 | Mikulak et al. |
| 9,102,099 B1 | 8/2015 | Karpas et al. |
| 9,126,367 B1 | 9/2015 | Mark et al. |
| 9,156,205 B2 | 10/2015 | Mark et al. |
| 9,174,389 B2 | 11/2015 | Swanson |
| 9,254,535 B2 | 2/2016 | Buller et al. |
| 9,321,609 B2 | 4/2016 | Koop et al. |
| 9,327,452 B2 | 5/2016 | Mark et al. |
| 9,327,453 B2 | 5/2016 | Mark et al. |
| 9,339,972 B2 | 5/2016 | Gordon |
| 9,353,481 B2 | 5/2016 | Gupta et al. |
| 9,533,451 B2 | 1/2017 | Folgar et al. |
| 9,579,851 B2 | 2/2017 | Mark et al. |
| 9,579,891 B2 | 2/2017 | Hayashi et al. |
| 9,592,660 B2 | 3/2017 | Reese et al. |
| 9,595,037 B2 | 3/2017 | Glasgow et al. |
| 9,656,429 B1 | 5/2017 | Mantha et al. |
| 9,724,877 B2 | 8/2017 | Flitsch et al. |
| 9,738,030 B2 | 8/2017 | Lee et al. |
| 9,757,880 B2 | 9/2017 | Rothfuss et al. |
| 9,796,140 B2 | 10/2017 | Page et al. |
| 9,815,268 B2 | 11/2017 | Mark et al. |
| 10,052,813 B2 | 8/2018 | Armijo et al. |
| 2005/0098260 A1 | 5/2005 | Chen et al. |
| 2006/0180957 A1 | 8/2006 | Hopkinson et al. |
| 2010/0312364 A1 | 12/2010 | Eryilmaz et al. |
| 2013/0101728 A1 | 4/2013 | Keremes et al. |
| 2013/0255346 A1 | 10/2013 | Danby et al. |
| 2013/0316081 A1 | 11/2013 | Kovalcik et al. |
| 2014/0232035 A1 | 8/2014 | Bheda |
| 2014/0265035 A1 | 9/2014 | Buser et al. |
| 2014/0268604 A1 | 9/2014 | Wicker et al. |
| 2014/0277669 A1 | 9/2014 | Nardi et al. |
| 2014/0291886 A1 | 10/2014 | Mark et al. |
| 2014/0328963 A1* | 11/2014 | Mark ............... B29C 64/20 425/143 |
| 2014/0361460 A1 | 12/2014 | Mark |
| 2014/0371895 A1 | 12/2014 | Sadusk et al. |
| 2015/0045928 A1 | 2/2015 | Perez et al. |
| 2015/0052025 A1 | 2/2015 | Apsley et al. |
| 2015/0097308 A1 | 4/2015 | Batchelder et al. |
| 2015/0147427 A1* | 5/2015 | Lundwall ............ B29C 67/0055 425/375 |
| 2015/0246481 A1* | 9/2015 | Schlick ............... B29C 35/00 264/461 |
| 2015/0251356 A1 | 9/2015 | Batchelder et al. |
| 2015/0273583 A1 | 10/2015 | Bumgardner |
| 2015/0298393 A1 | 10/2015 | Suarez |
| 2015/0314532 A1 | 11/2015 | Gordon et al. |
| 2015/0321255 A1 | 11/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336292 A1 | 11/2015 | Mikulak et al. |
| 2015/0360288 A1 | 12/2015 | Zalewski et al. |
| 2016/0031159 A1 | 2/2016 | Church et al. |
| 2016/0038655 A1 | 2/2016 | Weisman et al. |
| 2016/0046081 A1 | 2/2016 | Kim et al. |
| 2016/0075091 A1 | 3/2016 | Cable |
| 2016/0082641 A1 | 3/2016 | Bogucki et al. |
| 2016/0129643 A1 | 5/2016 | Mark et al. |
| 2016/0136885 A1 | 5/2016 | Nielsen-Cole et al. |
| 2016/0136887 A1 | 5/2016 | Guillemette et al. |
| 2016/0144564 A1 | 5/2016 | Padgett et al. |
| 2016/0144565 A1 | 5/2016 | Mark et al. |
| 2016/0144566 A1 | 5/2016 | Mark et al. |
| 2016/0151833 A1 | 6/2016 | Tsao |
| 2016/0159012 A1 | 6/2016 | Lee et al. |
| 2016/0184925 A1 | 6/2016 | Huang et al. |
| 2016/0185028 A1 | 6/2016 | Bogue et al. |
| 2016/0236279 A1 | 8/2016 | Ashton et al. |
| 2016/0236414 A1 | 8/2016 | Reese et al. |
| 2016/0236416 A1 | 8/2016 | Bheda et al. |
| 2016/0236419 A1 | 8/2016 | Griffin et al. |
| 2016/0243649 A1 | 8/2016 | Zheng et al. |
| 2016/0257068 A1 | 9/2016 | Albert et al. |
| 2016/0266573 A1 | 9/2016 | Bheda et al. |
| 2016/0271880 A1 | 9/2016 | Bheda et al. |
| 2016/0288264 A1 | 10/2016 | Jones et al. |
| 2016/0297142 A1 | 10/2016 | Bheda et al. |
| 2016/0297935 A1 | 10/2016 | Reese et al. |
| 2016/0303805 A1 | 10/2016 | Chen et al. |
| 2016/0311165 A1 | 10/2016 | Mark et al. |
| 2016/0325491 A1 | 11/2016 | Sweeney et al. |
| 2016/0332366 A1 | 11/2016 | Donovan |
| 2016/0332380 A1 | 11/2016 | De Pena et al. |
| 2016/0346998 A1 | 12/2016 | Mark et al. |
| 2016/0361869 A1 | 12/2016 | Mark et al. |
| 2016/0368213 A1 | 12/2016 | Mark |
| 2017/0021455 A1* | 1/2017 | Dallarosa ............ B33Y 10/00 |
| 2017/0021565 A1* | 1/2017 | Deaville ............ B29C 64/165 |
| 2017/0036403 A1 | 2/2017 | Ruff et al. |
| 2017/0057160 A1 | 3/2017 | Duty et al. |
| 2017/0057167 A1 | 3/2017 | Van Tooren et al. |
| 2017/0072633 A1 | 3/2017 | Hsu |
| 2017/0080642 A1 | 3/2017 | Tyler |
| 2017/0087767 A1* | 3/2017 | Grewell ............... B33Y 50/02 |
| 2017/0096576 A1 | 4/2017 | Bheda et al. |
| 2017/0120519 A1 | 5/2017 | Mark |
| 2017/0144375 A1 | 5/2017 | Waldrop, III et al. |
| 2017/0145155 A1* | 5/2017 | Wright ................ C08L 67/025 |
| 2017/0146489 A1 | 5/2017 | Redding et al. |
| 2017/0151704 A1* | 6/2017 | Go ...................... B33Y 10/00 |
| 2017/0151728 A1 | 6/2017 | Kunc et al. |
| 2017/0151731 A1* | 6/2017 | Ho Yew Chi .......... B29C 70/38 |
| 2017/0157843 A1 | 6/2017 | Nystrom et al. |
| 2017/0173868 A1 | 6/2017 | Mark |
| 2017/0173883 A1* | 6/2017 | Gray .................... B22F 3/1055 |
| 2017/0197371 A1 | 7/2017 | Fetfatsidis et al. |
| 2017/0210074 A1 | 7/2017 | Ueda et al. |
| 2017/0247553 A1* | 8/2017 | Ganapathiappan .... B33Y 70/00 |
| 2017/0266885 A1 | 9/2017 | Gifford et al. |
| 2017/0274585 A1 | 9/2017 | Armijo et al. |
| 2017/0304894 A1 | 10/2017 | Buller |
| 2017/0326802 A1 | 11/2017 | Mark et al. |
| 2017/0368748 A1* | 12/2017 | De Pena ............... B33Y 10/00 |
| 2018/0001550 A1* | 1/2018 | Zhao .................... B33Y 30/00 |
| 2018/0154437 A1* | 6/2018 | Mark ................... B22F 1/0059 |
| 2018/0243978 A1* | 8/2018 | Nguyen ............... B33Y 70/00 |
| 2018/0272460 A1 | 9/2018 | Nelson et al. |
| 2019/0061238 A1* | 2/2019 | Schirtzinger ......... B29C 64/118 |
| 2019/0134750 A1* | 5/2019 | Nauka ................. B23K 26/702 |

FOREIGN PATENT DOCUMENTS

| | | |
|---|---|---|
| EP | 3148711 A1 | 4/2017 |
| EP | 3150361 A1 | 4/2017 |
| GB | 2453945 A | 4/2009 |
| KR | 100847550 B1 | 7/2008 |
| KR | 20130060144 A | 6/2013 |
| KR | 101451794 B1 | 10/2014 |
| WO | WO-2014193505 A1 | 12/2014 |
| WO | WO-2015009938 A1 | 1/2015 |
| WO | WO-2015042422 A1 | 3/2015 |
| WO | WO-2015119819 A2 | 8/2015 |
| WO | WO-2015130401 A2 | 9/2015 |
| WO | WO-2015163776 A1 | 10/2015 |
| WO | WO-2015164954 A1 | 11/2015 |
| WO | WO-2015193819 A2 | 12/2015 |
| WO | WO-2016142472 A1 | 9/2016 |
| WO | WO-2016187106 A1 | 11/2016 |
| WO | WO-2017008789 A1 | 1/2017 |
| WO | WO-2017100783 A1 | 6/2017 |
| WO | WO-2017123726 A1 | 7/2017 |
| WO | WO-2017149896 A1 | 9/2017 |

(56) References Cited

FOREIGN PATENT DOCUMENTS

| WO | WO-2017210490 A1 | 12/2017 |
|---|---|---|
| WO | WO-2018182773 | 10/2018 |
| WO | WO-2018204574 | 11/2018 |
| WO | WO-2018217650 A1 | 11/2018 |
| WO | WO-2019050509 | 3/2019 |

OTHER PUBLICATIONS

PCT/US2018/030785 International Search Report and Written Opinion dated Sep. 28, 2018.
U.S. Appl. No. 15/845,629 Office Action dated Oct. 19, 2018.
U.S. Appl. No. 15/845,673 Office Action dated Oct. 19, 2018.
U.S. Appl. No. 15/845,762 Office Action dated Oct. 19, 2018.
U.S. Appl. No. 15/845,843 Office Action dated Oct. 19, 2018.
PCT/US2018/033710 International Search Report and Written Opinion dated Oct. 31, 2018.
Clausen, et al. Exploiting Additive Manufacturing Infill in Topology Optimization for Improved Buckling Load. Engineering 2.2 (2016): 250-257.
Co-pending U.S. Appl. No. 15/845,629, filed Dec. 18, 2017.
Co-pending U.S. Appl. No. 15/845,673, filed Dec. 18, 2017.
Co-pending U.S. Appl. No. 15/845,762, filed Dec. 18, 2017.
Co-pending U.S. Appl. No. 15/845,843, filed Dec. 18, 2017.
Co-pending U.S. Appl. No. 16/033,041, filed Jul. 11, 2018.
International search report and written opinion dated Aug. 17, 2017 for PCT Application No. PCT/US2017/035551.
International search report and written opinion dated Nov. 22, 2017 for PCT Application No. PCT/US2017/045986.
Notice of allowance dated Jan. 4, 2017 for U.S. Appl. No. 15/232,767.
Notice of allowance dated Apr. 27, 2017 for U.S. Appl. No. 15/232,767.
Notice of allowance dated Nov. 30, 2017 for U.S. Appl. No. 14/623,471.
Office action dated Mar. 30, 2017 for U.S. Appl. No. 14/623,471.
Office action dated Aug. 30, 2017 for U.S. Appl. No. 14/623,471.
Office action dated Sep. 14, 2017 for U.S. Appl. No. 14/621,205.
Office action dated Nov. 14, 2016 for U.S. Appl. No. 15/232,767.
PCT/US2017/050153 International Search Report and Written Opinion dated May 24, 2018.
PCT/US2017/050155 International Search Report and Written Opinion dated Dec. 7, 2017.
U.S. Appl. No. 15/471,786 Notice of Allowance dated Jun. 27, 2018.
U.S. Appl. No. 15/471,786 Notice of Allowance dated Feb. 7, 2018.
U.S. Appl. No. 15/471,786 Office Action dated Aug. 23, 2017.
U.S. Appl. No. 15/845,629 Office Action dated Apr. 13, 2018.
U.S. Appl. No. 15/845,673 Office Action dated Apr. 11, 2018.
U.S. Appl. No. 15/845,762 Office Action dated Apr. 6, 2018.
U.S. Appl. No. 15/845,843 Office Action dated Apr. 3, 2018.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
Zhang, et al. Study on Metamorphic Rolling Mechanism for Metal Hybrid Additive Manufacturing. The 24th international SFF symposium—an additive manufacturing conference. Aug. 2013.
U.S. Appl. No. 15/845,843 Office Action dated Mar. 8, 2019.
U.S. Appl. No. 15/845,629 Office Action dated Apr. 19, 2019.
U.S. Appl. No. 15/845,673 Office Action dated Apr. 19, 2019.
U.S. Appl. No. 15/845,762 Office Action dated May 3, 2019.
Co-pending U.S. Appl. No. 16/672,025, filed Nov. 1, 2019.
Co-pending U.S. Appl. No. 16/688,320, filed Nov. 19, 2019.
U.S. Appl. No. 15/845,629 Office Action dated Nov. 1, 2019.
U.S. Appl. No. 15/845,762 Office Action dated Nov. 1, 2019.
U.S. Appl. No. 16/033,041 Office Action dated Sep. 13, 2019.
U.S. Appl. No. 15/845,673 Office Action dated Dec. 27, 2019.
U.S. Appl. No. 15/845,843 Office Action dated Dec. 27, 2019.
EP17807520.6 The Extended European Search Report dated Dec. 6, 2019.
WIPO, "International Preliminary Report on Patentability," International Application No. PCT/US2018/030785, International Filing Date May 3, 2018.
WIPO, "Written Opinion of the International Searching Authority," International Application No. PCT/US2018/030785, International Filing Date May 3, 2018.
Office action, U.S. Appl. No. 16/672,025, dated Dec. 22, 2020.
Office action, U.S. Appl. No. 16/672,025, dated Jul. 9, 2021.

* cited by examiner

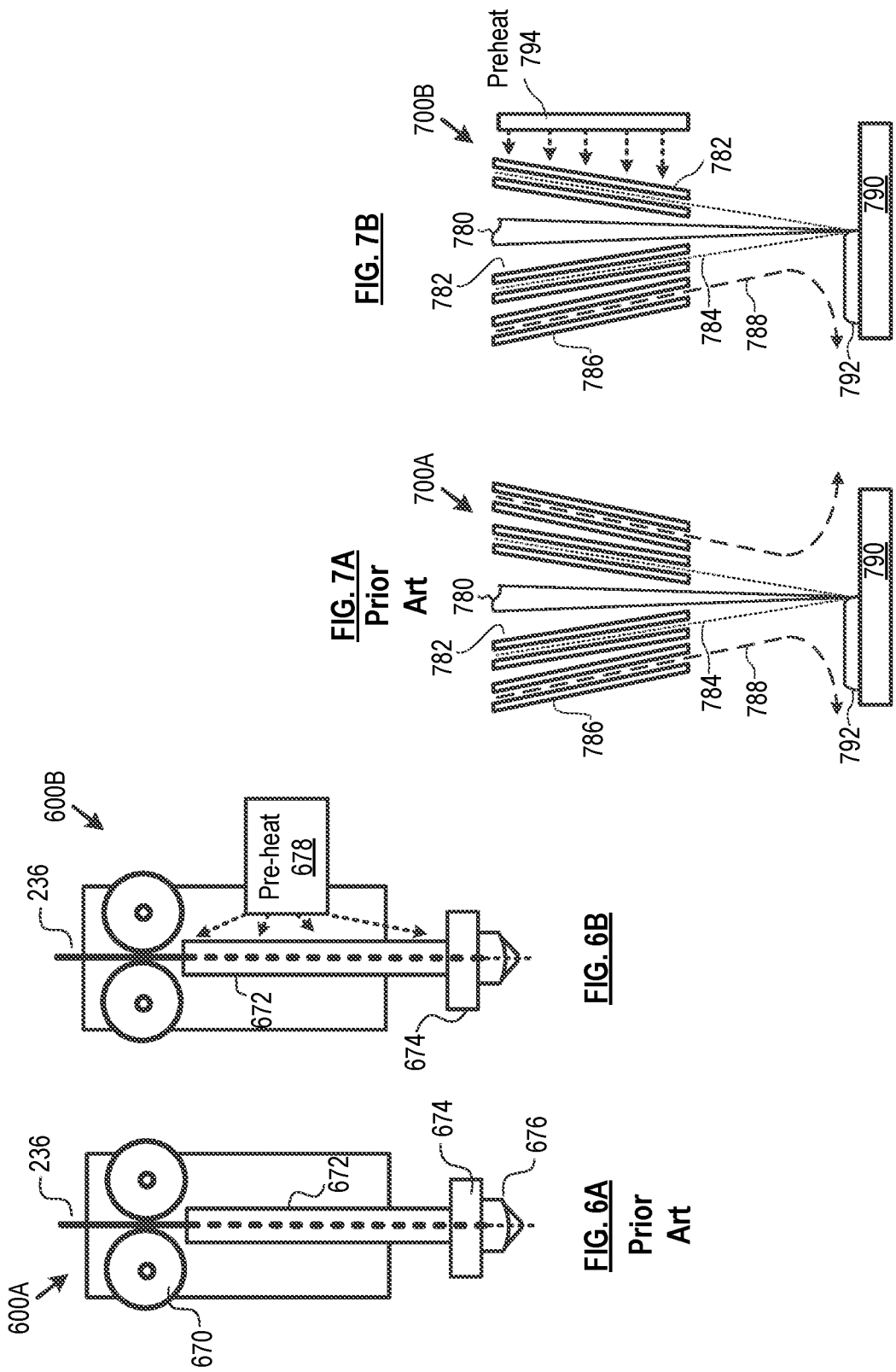

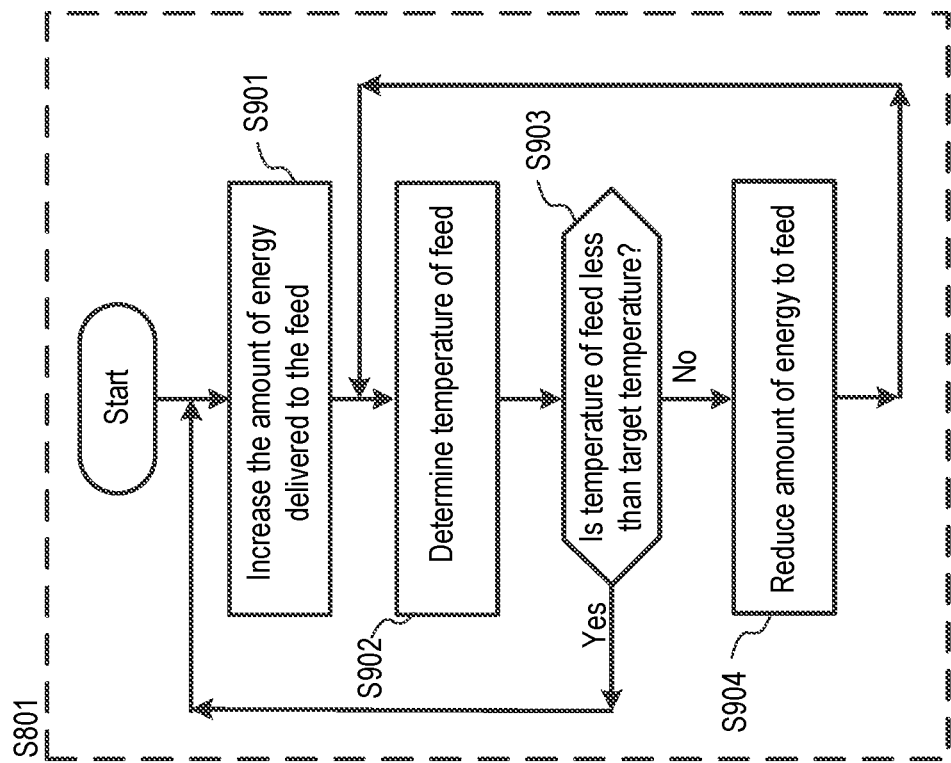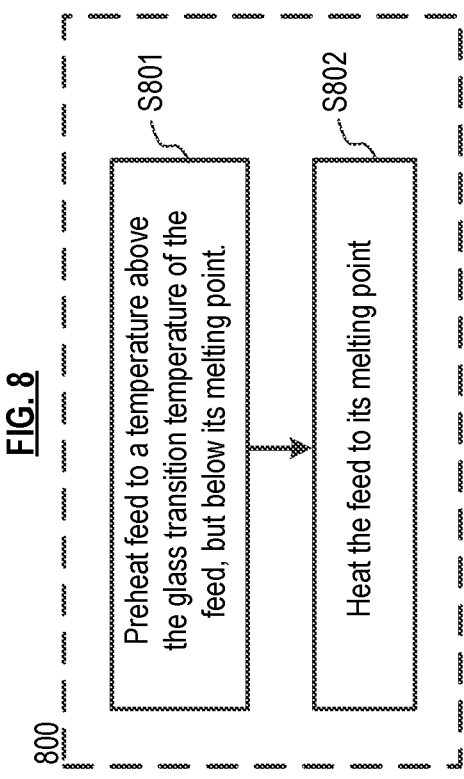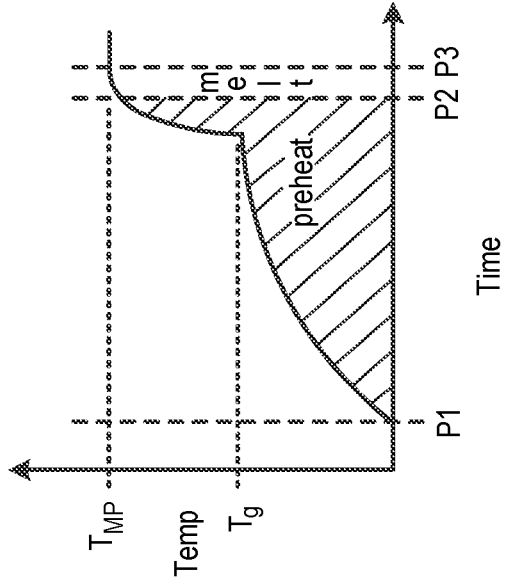

METHOD AND APPARATUS FOR ADDITIVE MANUFACTURING WITH PREHEAT

FIELD OF THE INVENTION

The present invention relates to an additive manufacturing process.

BACKGROUND OF THE INVENTION

Additive manufacturing—so called "3D printing" in popular vernacular—is the term given to processes that manufacture objects via sequential-layer material addition/joining throughout a 3D work envelope under automated control. ISO/ASTM52900-15 defines seven categories of additive manufacturing processes: binder jetting, directed energy deposition, material extrusion, material jetting, powder bed fusion, sheet lamination, and vat polymerization.

Extrusion-based 3D printing processes produce an object by extruding small beads of material, typically thermoplastics, which quickly harden to form a layer. Successive layers of material are deposited to create the object.

There are limitations on the speed on which the various 3D printing processes can print. Most literature on the subject focuses on mechanical limitations of the particular 3D printing process. For example, for material extrusion, two important limitations are control over the extruded filament and the rate at which the material can be extruded. Regarding the latter issue, guidelines are often presented in terms of a volume of material that can be printed per second. Given a desired thickness for the extrudate layer, print speed is therefore dictated. If one attempts to exceed that rate, the feeding pressure will increase, eventually causing motor issues (stalling, etc.) or filament stripping. It is known that by increasing the extruder temperature, the pressure issue can be addressed, but higher extruder temperatures can result in filament decomposition.

A need therefore exists for a way to increase the print speed of the 3D printing process.

SUMMARY

The present invention provides an apparatus and method that address some of the shortcomings of the prior art.

In accordance with the invention, the polymeric material used for printing is preheated prior to being melted. This approach is applicable, at a minimum, to directed energy-deposition, material-extrusion, and material-jetting processes of 3D printing. Furthermore, this applies to a filament shaping deposition system and method for 3D printing developed by the inventor(s) and disclosed in U.S. patent application Ser. No. 15/471,786, which is incorporated by reference herein.

The inventor(s) recognized that the speed at which some 3D printing processes can be operated is limited by the thermal response time of the polymer feed (e.g., the filament, etc.). This response time is technically described as the relaxation or reptation time under polymer reptation theory.

The more quickly that the polymer feed to a 3D printer is heated, the more material the printer can process in a given period-of-time. But thermal degradation occurs if a polymer is heated too quickly. This degradation can involve chain scission (i.e., breaking). The resulting segments can react with one another and change the properties of the polymer. This can lead to a degradation in physical properties in a printed object relative to initially specified properties. Such property changes include reduced ductility and embrittlement, chalking, color changes, cracking, and a general reduction in most other desirable physical properties.

To avoid thermal degradation, a polymer must be given time to "relax" to accommodate the energy it receives The time it takes for a polymer chain to relax is unique to each polymer and, according to one theory, is dictated by the "reptation" or relaxation time of the polymer. Reptation is the thermal motion of very long, linear, entangled macromolecules in the polymer melt stage. According to the theory, the reputation time is the time it takes a polymer chain to diffuse out of a virtual tube to which the polymer is considered to be confined. Bottom line, the speed at which a polymer filament can be processed is limited by reptation.

A typical heating profile for some 3D printing processes is to raise the temperature of the polymer feed to its melting point in a single step, either immediately before or after deposition, as a function of the 3D printing process. In this method, the rate at which the temperature can be raised—and at which the polymer is processed—is limited by reptation time, as indicated above. The inventor recognized that if the polymer feed is preheated to a temperature at or above its glass transition temperature ($T_g$) while in the 3D printer, and subsequently raised to its melting temperature (either immediately before or after deposition per the specific process), the polymer can be processed more rapidly than in the prior art.

In particular, the polymer feed necessarily has a residence time in the 3D printer, and to the extent the feed is preheated during that residence time, there is no "cost" to the time required for such preheating. There is, however, a "cost" for the time it takes to melt the feed, which occurs at the exit of 3D printer or on the build surface. Since, in accordance with the present teachings, the feed is entering the melting zone at much higher temperature than would otherwise be the case, the melting time is significantly reduced. In fact, experiments have demonstrated a five- to six-fold increase in the speed at which polyaryletherketones (PEAK) polymer feeds can be processed by virtue of the novel preheating step disclosed herein.

At the glass transition temperature, the polymer chains become increasingly mobile and are able to slide past one another, thereby processing the energy received during heating. Since the polymer feed will be, on average, more mobile during the melting step than the preheating step, the polymer can be heated at a greater rate during the melting step. This further increases processing time.

Thus, in accordance with the present teachings, various 3D printing devices and methods are improved by preheating the polymer feed to at least its glass transition temperature (and typically above it), but below its melting point, prior to melting the polymer for incorporation into the build object.

The illustrative embodiment of the invention comprises a filament-shaping deposition system with preheat for additive manufacturing. Several alternative embodiments are depicted wherein preheat is added other 3D printing processes, including material extrusion, directed energy deposition, and material jetting processes.

In accordance with the illustrative embodiment, a filament-shaping deposition system includes a positioning subsystem, a feed subsystem, an optional preheating subsystem, a focused heat source, and a filament shaper.

In the illustrative embodiment, the positioning subsystem comprises a multi-axis end effector (e.g., a robotic arm, etc.). In the illustrative embodiment, the multi-axis end effector has sufficient degrees of freedom (i.e., six DOF) to enable true three-dimensional printing. That is, the positioning subsystem is capable of delivering a feed filament to an arbitrary location in space, as specified in accordance with the build instructions.

The feed subsystem delivers the filament to a build surface (e.g., a build plate, etc.). The focused heat source is used to (a) raise the temperature of the filament to its melting point, and (b) melt the previously deposited layer of material just below the filament currently being deposited. In the illustrative embodiment, the focused heat source is a laser. The filament shaper applies pressure to the melted filament, thereby controlling its position/location and altering its cross section from circle to flat-rectangular (i.e., ribbon-like). As discussed later in this specification, altering the filament's cross section in the aforementioned fashion results in improvements in the properties of the printed object.

The preheating subsystem can be embodied in a variety of ways, which can be different for different 3D printing processes as a function of their varying configurations. Some non-limiting embodiments of the preheating subsystem, for use in context with applicant's filament-shaping deposition method, are discussed below.

In a first embodiment, the preheating subsystem comprises a direct contact heater for the filament tube tube/guide through which the filament passes prior to deposition. In some embodiments, the heater, in the form of ribbon, wire or other flexible material, is wrapped around the exterior of the feed tube below an in-line cutter.

In a second embodiment, the preheating subsystem comprises forced hot air, such as can be delivered from a hot air blower. In some embodiments, slots, which are formed in the feed tube below the in-line cutter, provide for direct contact between the hot air and the filament.

In a third embodiment, a laser is used to preheat the filament. In some embodiments, a laser with sufficient power, dedicated for preheating, is used. The beam from the laser is directed at the portion of the feed tube below the in-line cutter. In some other embodiments, the beam from the focused heat source is split into two beams of unequal intensity. The beam with the lower intensity is directed to the portion of the feed tube below the in-line cutter for preheating the filament. The beam with the higher intensity is directed to the filament (and the most recently deposited underlying layer).

BRIEF DESCRIPTION OF THE DRAWINGS

FIG. 6A depicts a side view of a portion of a conventional material extrusion (fused deposition modeling) 3D printer.

FIG. 6B depicts a side view of a portion of a material extrusion (fused deposition modeling) 3D printer in accordance with the present teachings.

FIG. 7A depicts a side view of a portion of a conventional directed energy deposition 3D printer.

FIG. 7B depicts a side view of a portion of a directed energy deposition 3D printer in accordance with the present teachings.

FIG. 8 depicts a method in accordance with an illustrative embodiment of the present invention.

FIG. 9 depicts an embodiment of the method of claim 8 including temperature control.

FIG. 10 depicts the heating profile of the polymer feed in accordance with the present teachings.

DETAILED DESCRIPTION OF THE INVENTION

Figure 1:
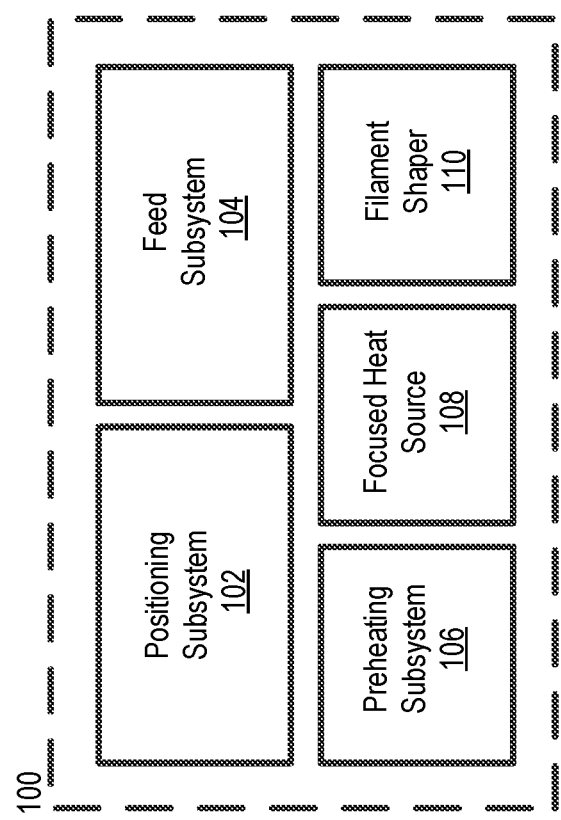
FIG. 1 depicts a block diagram of the salient components of a filament-shaping deposition system for additive manufacturing in accordance with an illustrative embodiment of the present invention.

FIG. 8 depicts method 800 in accordance with the illustrative embodiment of the present invention. The method is generic to various 3D printer technologies. In accordance with task S801, the polymer feed is preheated to a temperature above its glass transition temperature $T_g$ but below the melting point. The temperature to which the feed is preheated depends on the polymer and its relative stiffness at the glass transition temperature. Some materials remain relatively stiff at $T_g$ while others can soften rather quickly above $T_g$. Generally, the stiffer the material is at the glass transition temperature, the higher the preheat temperature (i.e., closer to the melting point). Typically, the feed will be preheated to a temperature that is in a range of about 0.7 to about 0.95 of its melting point, and more typically in a range of about 0.8 to about 0.9 of its melting point.

In task S802, the polymer feed is heated to its melting point. Typically, but not necessarily, separate devices preheat the feed and melt the feed. In some embodiments, two different type of devices are used for the preheat step and the melt step (e.g., a direct contact heater for preheat and a laser for melting, etc.). In some other embodiments, two different instances of the same type of device are used for the preheat step and the melt step (e.g., a first laser for preheat, a second laser for melt, etc). In some cases, the same device is used for both preheat and melt (e.g., a single laser with a beam splitter, etc.).

In some embodiments, simple experimentation is used to determine the heat input required for preheating and melting, as a function of the polymer feed and feed rate. In some embodiments, a temperature control loop is implemented to control the preheating operation, such as the notional control loop depicted in FIG. 9.

In such embodiments, task S801 comprises subtasks S901 through S904. In particular, per subtask S901, preheating begins with the delivery of energy to the polymer feed. Preheat is provided by any heating arrangement suitable for the configuration of the particular 3D printer being used, some of which arrangements are disclosed later in this specification.

In subtask S902, the temperature of polymer feed is determined via any appropriate measurement device/technique, such as thermocouples, resistance temperature devices, infrared temperature measurement devices, bimetallic temperature measurement devices, fluid-expansion temperature measurement devices, change-of-state temperature measurement devices, and the like.

Query, at subtask S903, if the temperature of the feed is less than the target (i.e., controller set-point) temperature, TT, wherein, as previously noted: $T_g \leq TT <$ melting point of the polymer feed. The temperature is measured at the end of the preheating zone or, alternatively, right before the feed reaches the zone in which it will be melted.

If the measured temperature is less than the target temperature, processing loops back to S901 to increase the amount of energy being delivered to the feed. The loop of subtasks S901 through S903 is repeated until the answer to the query at S903 is "no."

When the temperature of the feed is not less than the target temperature, the system reduces the energy delivered to the polymer feed at subtask S904. Processing then loops back to subtask S902 wherein the temperature of the polymer feed is measured. The loop of subtasks S902 through S904 is repeated until the answer to the query at S903 is "yes."

This method describes, in general terms, the operation of a temperature controller applying closed-loop feedback control. The temperature control loop disclosed in FIG. 9 can be implemented via, for example, a temperature control system including a temperature measurement device, a controller (e.g., typically PI or PID, etc.), and an actuator, etc., to alter the energy being provided to the process by the preheater. A separate temperature-control loop can be used to control melting operation S802 of method 800.

As compared to prior-art 3D printers and methods for printing, there are several distinguishing features of embodiments of the claimed invention. First consider the prior art. The polymer feed is heated to melting at a discrete location from what is typically a relatively low starting temperature (i.e., ambient temperature plus whatever additional heating the filament experiences as it moves through the 3D printer until it reaches the location at which it is melted). In most material-extrusion-based 3D printers, melting occurs at a heating block just prior to the extrusion nozzle. In many other processes, melting occurs at the build surface, such as by exposure to a focused heat source (e.g., laser, etc.).

Print speed is limited to the rate at which the polymer feed can be melted. As previously indicated, that rate is limited by the relaxation time or reptation time, which is characteristic of the particular polymer feed. Thus, given the typically very small zone in which melting occurs and the aforementioned limitation on heating rate due to relaxation time, a bottleneck occurs.

There is a certain residence time of the polymer feed in a 3D printer as a consequence of the printer's configuration (feed lines, etc.). Since the polymer must traverse some distance through the printer and must take some time doing so, that time can be used, at no penalty, to preheat the polymer feed. Preheated in accordance with the present teachings, the polymer feed approaches the melting zone at or above (typically well above) its glass transition temperature. The feed is thus entering the melting zone at a much higher temperature as compared to the prior art; consequently, much less of a temperature increase is required to melt the feed. Assuming the same rate of heating in the melting zone for both the present invention and the prior art, embodiments of the invention require much less time to melt the feed. Since the polymer feed can be melted more quickly, the polymer feed can be processed faster than in the prior art. As previously mentioned, embodiments of the invention result in a five- to six-fold increase in polymer feed rate (processing speed) for PEAK polymer feeds.

With reference to FIG. 10, the time it takes to preheat the feed (i.e., to a temperature well above its glass transition temperature) is represented by the time interval (P2−P1). The time it takes to heat the feed from its preheat temperature to its melt point is represented by the time interval (P3−P2). Assuming the same rate of heating for embodiments of the invention as well as the prior art (for a given polymer feed), the time otherwise required to melt the feed in the prior art is reduced by the amount (P2−P1). Thus, the time spent in the melting zone can be reduced by the fraction (P2−P1)/(P3−P1). Equivalently, the feed rate can be increased by the ratio (P2−P1)/(P3−P2).

By way of example, consider a heating rate of 500° C./second for a polymer filament. For PEEK ($T_g$=140° C. and processing temp=360° C.), assume a preheat temperature of 290° C. and a feed temperature of 25° C. The preheat step therefore takes (290−25)/500=0.53 seconds. And raising the temperature from 290° C. to 360° C. for the melting step takes (360−290)/500=0.14 seconds. Thus, in the absence of the preheat, the melting step would 0.53+0.14=0.67 seconds. This represents an increase in the processing rate of the feed by a factor of 0.67/0.14=4.8. Since the time to print an object (e.g., a commercial part, etc.) will typically take hours, the time-savings afforded by embodiments of the invention is quite significant.

Figure 11A:
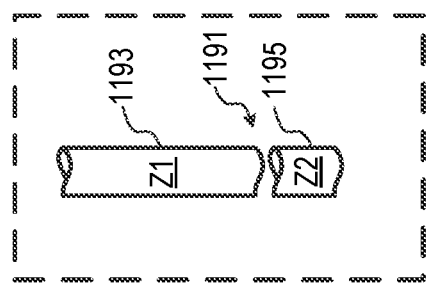
FIGS. 11A through 11C depicts various embodiments of preheating and melting zones for various 3D printer configurations.
Figure 11B:
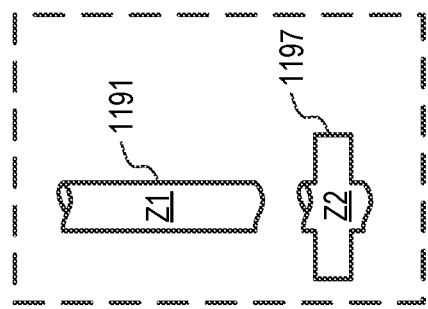
Figure 11C:
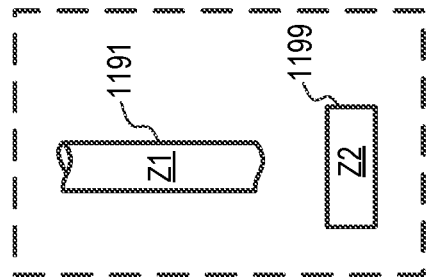

In embodiments of the invention, preheating and melting occur in two spatially distinct zones, as represented in FIGS. 11A-11C. In some embodiments, such as depicted in FIG. 11A, preheating zone Z1 and melting zone Z2 are in two spatially distinct regions 1193 and 1195 in the same element of the 3D printer, such as in feed line 1191. In some other embodiments, such as depicted in FIG. 11B, preheating zone Z1 and melting zone Z2 are in two distinct elements of the 3D printer. For example, preheating zone Z1 can be in feed line 1191 and melting zone Z2 can be in heating block 1197. In some further embodiments, such as depicted in FIG. 11C, preheating zone Z1 is located in the 3D printer whereas the melting zone Z2 is located outside of the 3D printer. For example, preheating zone Z1 can be in feed line 1191 and melting zone Z2 can be on build surface 1199.

It is notable that, in some embodiments, due to the spatial separation between the preheating zone and the melting zone, the temperature at which the feed enters the melting zone is slightly lower than the temperature at which the feed exits the preheating zone. Thus, in FIG. 10, for some embodiments, the feed does not exit preheating zone and enter melting zone at the same time P2. Rather, it enters the melting zone at some time after P2 and before P3, and the curve dips (i.e., temperature declines) after P2 due to some minimal cooling that occurs in the filament before heating in the melting zone occurs.

Turning now to some specific implementations of the present teachings, FIG. 1 depicts functional elements of filament-shaping deposition system 100 in accordance with the present invention. Included in system 100 are positioning subsystem 102, feed subsystem 104, preheating subsystem 106, focused heat source 108, and filament shaper 110.

In the illustrative embodiment, positioning subsystem 102 comprises a multi-axis end effector. Printing with such a multi-axis end effector is described, for example, in Ser. No. 14/184,010, previously referenced.

Feed subsystem 104 delivers a filament to a build surface (e.g., a plate, etc.). It will be appreciated that if manufacture of a part has already begun, the filament might be delivered to a previously deposited layer of filament. The term "build surface," as used in this disclosure and the appended claims, refers to either a build plate, or a previously deposited layer of material, or anything eke that the filament might be deposited upon.

In the illustrative embodiment, the filament comprises a thermoplastic resin. In some embodiments, the filament comprises a thermoplastic composite material, such as a cylindrical towpreg consisting of a continuous fiber (e.g., 1K, 3K, 6K, 12K, 24K, etc.) impregnated with thermoplastic resin. The continuous fiber includes, without limitation, carbon, fiberglass, aramid (AKA Kevlar), and carbon nanotubes (CNT).

The thermoplastic can be a semi-crystalline polymer or a mixture of a semi-crystalline polymer and an amorphous polymer. The semi-crystalline material can be, for example and without limitation, a polyaryletherketone (PAEK), such as polyetherketone (PEK), polyetheretherketone (PEEK), polyetherketoneketone (PEKK), polyetheretherketoneketone (PEEKK), and bolyetherketoneetherketoneketone (PEKEKK). The semi-crystalline polymer can also be other semi-crystalline thermoplastics, for example and without limitation, polyamide (PA), polybutylene terephthalate (PBT), poly(p-phenylene sulfide) (PPS).

If the feed is a blend of an amorphous polymer with a semi-crystalline polymer, the semi-crystalline polymer can be one of the aforementioned materials and the amorphous polymer can be a polyarylsulfone, such as polysulfone (PSU), polyethersulfone (PESU), polyphenylsulfone (PPSU), polyethersulfone (PES), polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), and polycarbonate (PC).

In the blend, the weight ratio of semi-crystalline material to amorphous material is in a range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed object.

Preheating subsystem 106 heats the filament before it is delivered to the build surface. In the illustrative embodiment, the filament is heated to a temperature that is above its glass transition temperature, $T_g$. As previously discussed, this increases the rate at which the filament-shaping deposition system can process a filament.

Focused heat source 108 is used to: (a) raise the temperature of the filament to melting after it is delivered to the build object. In the illustrative embodiment, focused heat source 108 is a laser.

A laser, in particular, facilitates accurate control of the processing temperature of the filament. In some alternative embodiments, focused heated sources 108 other than a laser may suitably be used, such as, without limitation, a concentrated microwave source (MASER), focused ultrasonic sound, focused IR, ion beam, electron beam, and focused hot air.

Filament shaper 110 applies pressure to the melted filament, thereby altering its cross section from substantially circular (circular, ellipsoidal, or rectangular) to flat-rectangular (i.e., ribbon-like) facilitating the consolidation of the melted filament into the geometry of the desired object.

Figure 2:
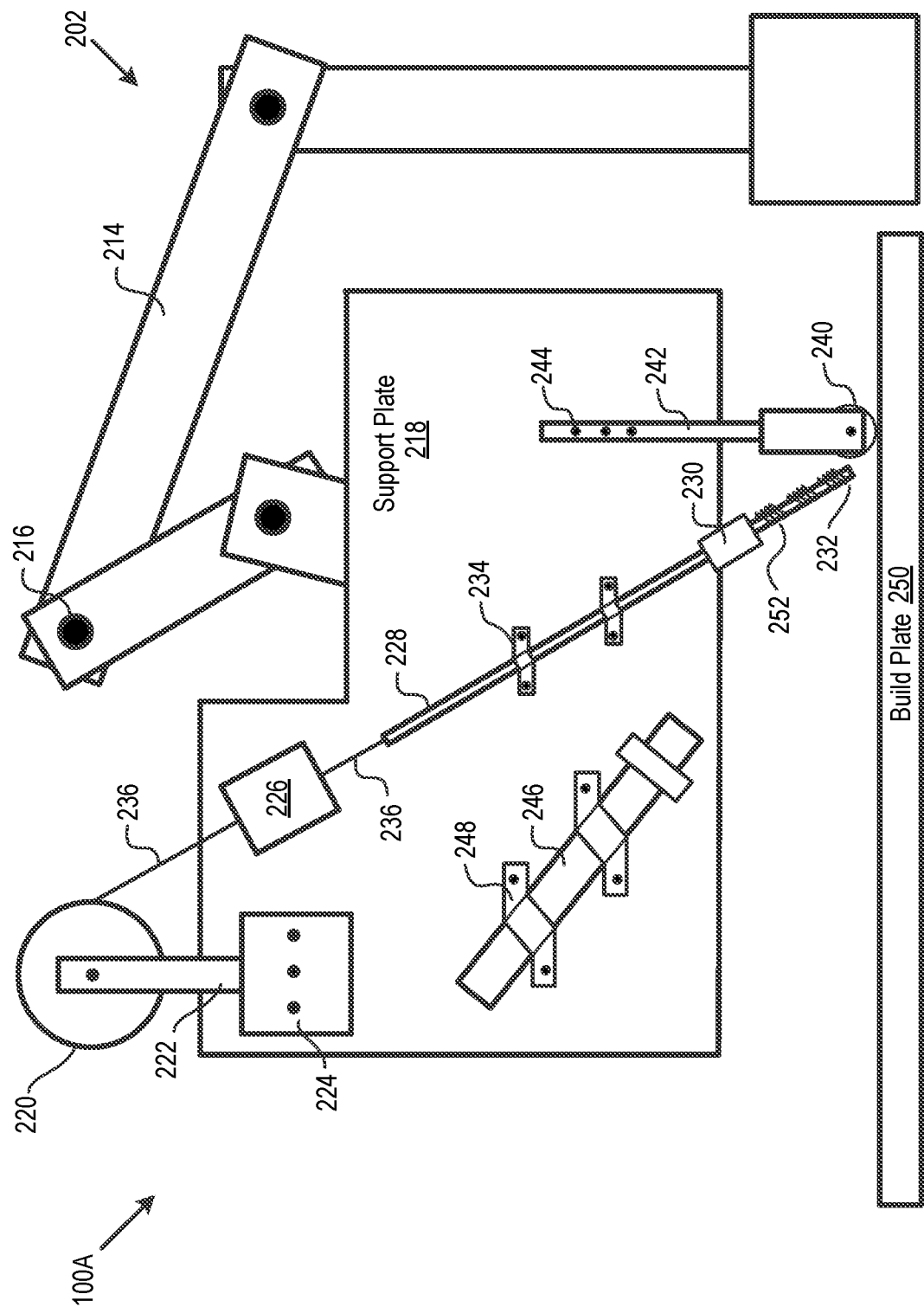
FIG. 2 depicts a first embodiment of the filament-shaping deposition system of FIG. 1.

FIG. 2 depicts filament-shaping deposition system 100A in accordance with an illustrative embodiment of invention. System 100A includes all of the functional elements of system 100 depicted in FIG. 1.

In system 100A of FIG. 2, positioning subsystem 102 is embodied as notional robotic arm 202. The robotic arm is coupled to support plate 218, which supports the various subsystems and elements of system 100A. Robotic arm 202 moves support plate 218, and all subsystems/elements attached thereto, so as to position the system to deliver a filament to a desired point in space consistent with the build instructions.

In some embodiments, robotic arm 202 is appropriately configured with rigid members 214 and joints 216 to provide six degrees of freedom (three in translation: x, y, and z axes; three in orientation: pitch, yaw, and roll). Printing with such a robotic arm is described, for example, in Ser. No. 14/184,010, previously referenced.

In some other embodiments, positioning subsystem 102 comprises a gantry (not depicted) having one or two translational degrees of freedom (x and/or y axes). In such embodiments, a build plate (on which the object is printed) is movable in the z direction (and possibly the x or y direction depending on the gantry capabilities), such that three degrees of freedom are provided for the build. In some further embodiments (not depicted), a robotic arm can be supported by a gantry. It is within the capabilities of those skilled in the art to design or specify a robotic arm, other multi-axis end effector, or gantry system to provide the requisite functionality for system 100A.

In system 100A, feed subsystem 104 includes spool 220, feed motor 226, feed tube 228, and cutter 230. Spool 220 is rotatably coupled to member 222, the latter of which is attached (e.g., via bolts 224, etc.) to support plate 218. Filament 236 is wound around spool 220. The filament passes through motor 226, feed tube 228, and cutter 230. Motor 226 draws filament 236 from spool 220. As it passes through cutter 230, filament 236 is sized in accordance with build instructions. Feed tube 228 is attached to support plate 218, such as via clamps 234.

After sizing via in-line cutter 230, filament 236 is heated via preheating subsystem 106. In system 100A, the preheating subsystem is embodied as direct-contact heater 252, such as in the form of heating tape, heating cord, etc. The heater is wrapped around the exterior of feed tube 228 below in-line cutter 230. Direct-contact heater 352 is controlled to heat filament 236 to a temperature at or above its glass transition temperature, but below its melting point.

A sized, preheated segment of filament 236 is delivered to build plate 250 from delivery end 232 of feed tube 228. In some embodiments, delivery end 232 of the feed tube 228 is appropriately configured and/or positioned to deliver the filament directly underneath filament shaper 110, which is embodied as roller 240. The roller rotates about pin 241 but is otherwise rigidly coupled to support plate 218 via member 242 and bolts 244. In other words, roller 240 is free to rotate about pin 241 along the x-direction, but is rigidly coupled to support plate 218 with respect to movements in along the y-direction and the z-direction.

In system 100A, focused heat source 108 is embodied as laser 246, such as a diode or fiber laser, although other types of lasers may suitably be used. Laser 246 is rigidly coupled to support plate 218, such as via clamps 248.

Laser 246 is aligned to illuminate the sized segment of filament that was delivered to build plate 250. The laser heats the filament to it melting point for incorporation into the build object.

A laser is preferentially used as focused heat source 108 because it enables precise and accurate control of the processing temperature. Because the laser spot size can be precisely controlled, the laser can be directed to heat both an underlying previously deposited layer, as well as the currently deposited layer, to melting. By melting the underlying layer during the deposition process, the bonding and adhesion between the layers increase, enhancing the overall mechanical properties of the build object.

Robotic arm 202 positions support plate 218 such that roller 240 applies pressure to the deposited filament. The applied pressure ensures that the filament sticks and adheres to the underlying layer. In the absence of such pressure, only gravity is available to bond and adhere the filament to the underlying layer, providing a relatively weak interface.

Furthermore, the applied pressure reshapes the cross section of the filament from cylindrical to rectangular. That is, the cylindrical towpreg is transformed into a rectangular tape. In the prior art, wherein gravity alone is applied during deposition, the filament's cross section morphs from circular to ellipsoidal. Ellipsoidal-shaped filaments tend to leave gaps and voids in the build object. The gaps and voids at interfaces act as nucleation sites for crack propagation, negatively impacting the mechanical properties of the build object.

The rectangular shape (i.e., tape form factor) is desired for the deposited filament because an object constructed therefrom will have minimal void space. And the reduction in void space results in printed objects having relatively better material properties.

Figure 3:
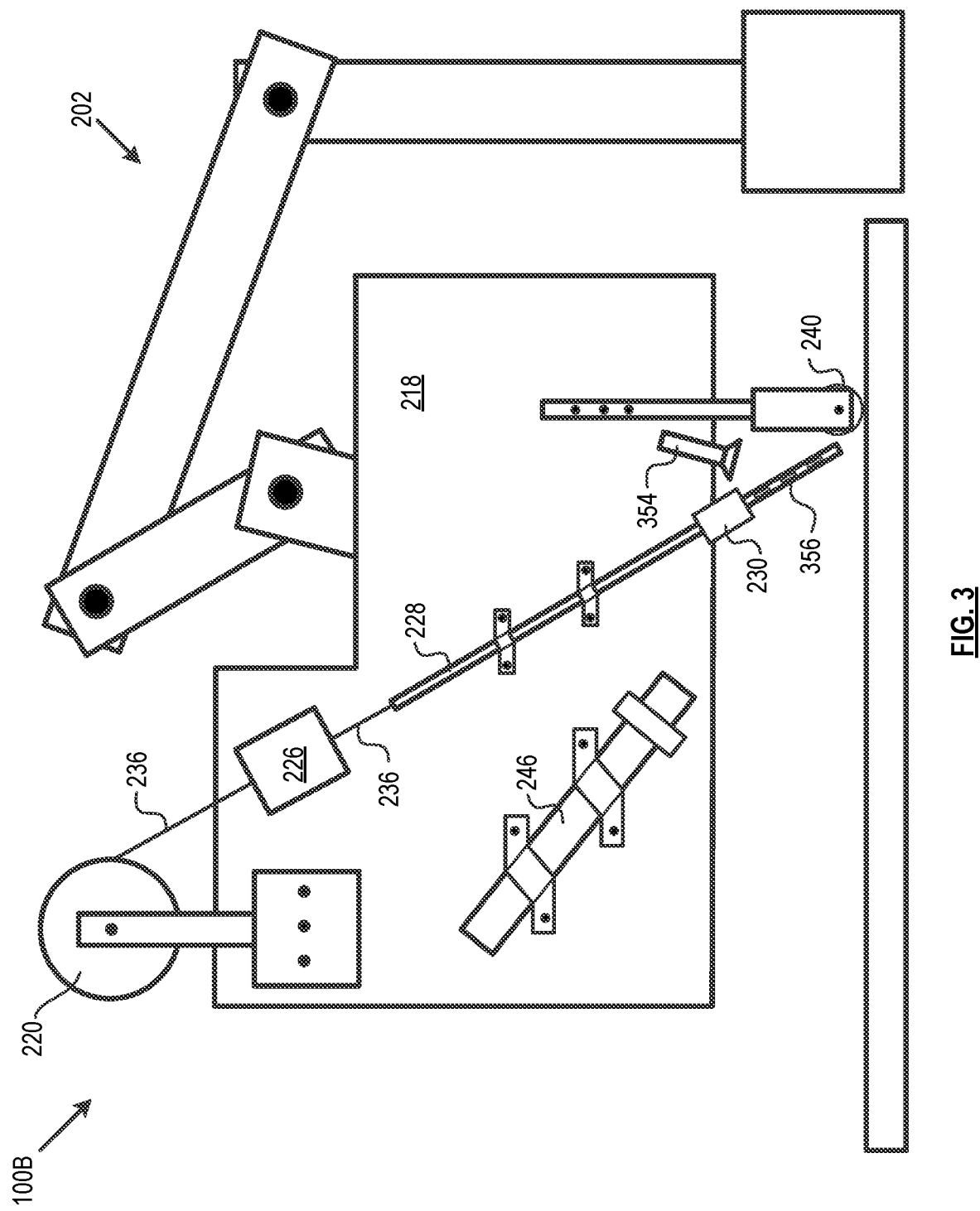
FIG. 3 depicts a second embodiment of the filament-shaping deposition system of FIG. 1.

FIG. 3 depicts filament-shaping deposition system 100B in accordance with an illustrative embodiment of invention. System 100B includes all of the functional elements of system 100 depicted in FIG. 1.

The various subsystems/elements of system 100B are embodied as in system 100B of FIG. 3, with the exception of preheating subsystem 106. That is, positioning subsystem 102 is embodied as robotic arm 202, feed subsystem 104 includes pulley 220, feed motor 226, feed tube 228, and cutter 230, focused heat source 108 is embodied as laser 246, and filament shaper 110 is embodied as roller 240.

In system 100B, preheating subsystem 106 is embodied as a forced hot air system, such as hot air blower 354. In some embodiments, slots 356 are formed in feed tube 228 below in-line cutter 230, and the hot air from blower 354 is directed at that portion of the feed tube.

Hot air blower 354 is controlled to heat filament 236 to a temperature at or above its glass transition temperature, but below its melting point.

Figure 4:
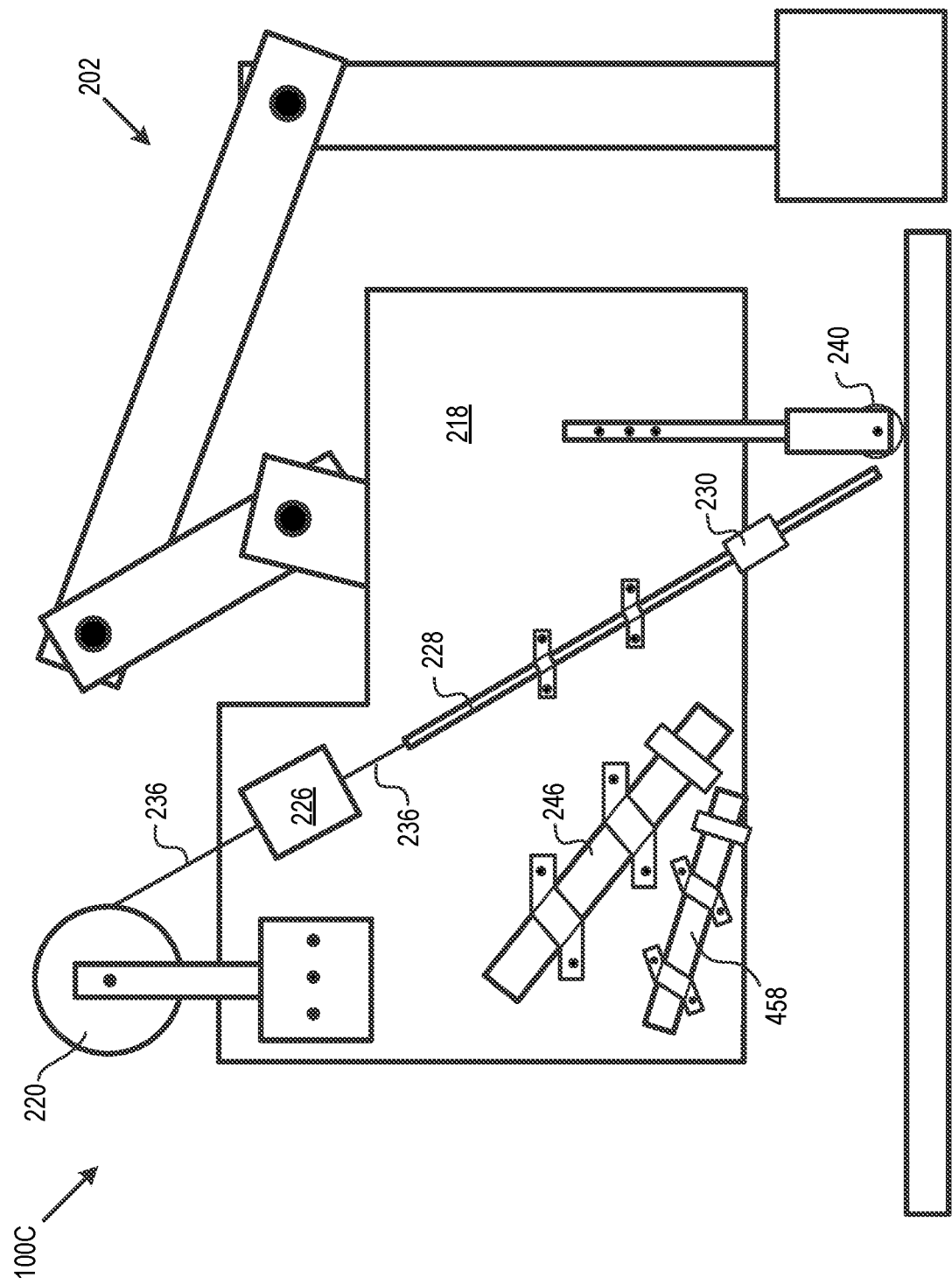
FIG. 4 depicts a third embodiment of the filament-shaping deposition system of FIG. 1.

FIG. 4 depicts filament-shaping deposition system 100C in accordance with an illustrative embodiment of invention. System 100C includes all of the functional elements of system 100 depicted in FIG. 1.

The various subsystems of system 100C are embodied as in systems 100B and 100A, with the exception of preheating subsystem 106. That is, positioning subsystem 102 is embodied as robotic arm 202, feed subsystem 104 includes pulley 220, feed motor 226, feed tube 228, and cutter 230, focused heat source 108 is embodied as laser 246, and filament shaper 110 is embodied as roller 240.

In system 100C, preheating subsystem 106 is embodied as laser 458. This laser has a lower power rating (or is operated at lower power) than laser 246. The beam from laser 458 is directed at the portion of feed tube 228 below in-line cutter 240. Laser 458 is controlled to heat filament 236 to a temperature at or above its glass transition temperature, but below its melting point.

Figure 5:
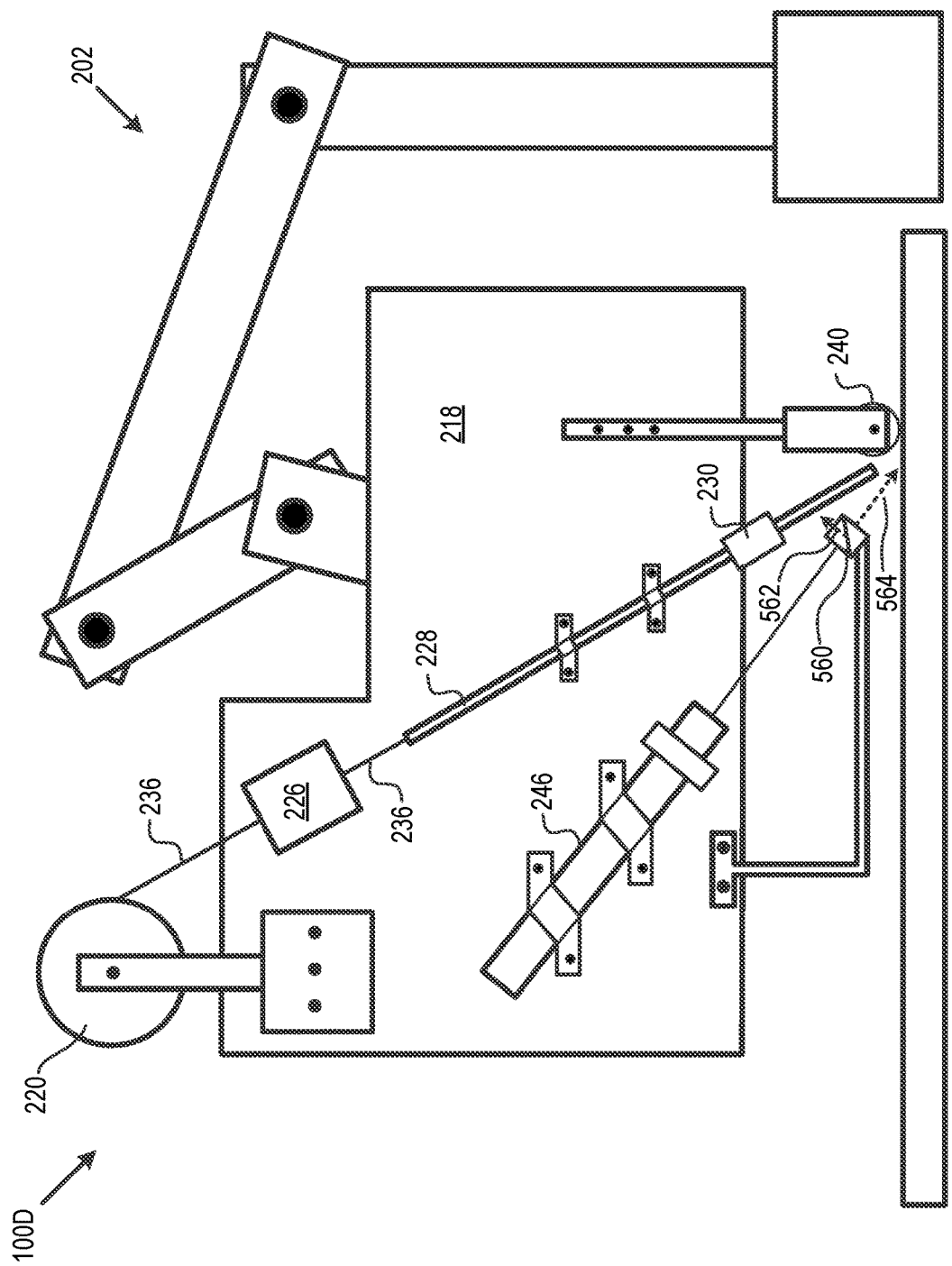
FIG. 5 depicts a fourth embodiment of the filament-shaping deposition system of FIG. 1.

FIG. 5 depicts filament-shaping deposition system 100D in accordance with an illustrative embodiment of invention. System 100D includes all of the functional elements of system 100 depicted in FIG. 1.

The various subsystems of system 100D are embodied as in systems 100C, 100B and 100A, with the exception of preheating subsystem 106. Once again, positioning subsystem 102 is embodied as robotic arm 202, feed subsystem 104 includes pulley 220, feed motor 226, feed tube 228, and cutter 230, focused heat source 108 is embodied as laser 246, and filament shaper 110 is embodied as roller 240.

In system 100D, laser 246 serves double-duty as focused heat source 108 and preheating subsystem 106. Beam splitter 560 is used to split the beam from laser 246 into two beams of unequal intensity. Beam 562, having relatively lower intensity, is focused on the portion of feed tube 228 below in-line cutter 230 for preheating the filament. The split is controlled so that beam 562 heats filament 236 to a temperature at or above its glass transition temperature, but below its melting point. Beam 564, having relatively higher intensity, is focused on the filament that is delivered to the build surface. The intensity of that beam is suitable for raising the temperature of the preheated filament to its melting point.

FIG. 6A depicts a side view of a portion of a conventional material extrusion (fused deposition modeling) 3D printer 600A, including pinch rollers 670, feed tube 672, heating block 674, and extrusion nozzle 676. In operation, pincher rollers 670, which are driven by a motor (not depicted), pull filament 236 from a spool (not depicted) through feed tube 672. The filament is heated to melting into heating block 674. The heated filament is forced out of extrusion nozzle 676 at a reduced diameter.

FIG. 6B depicts a modified material-extrusion 3D printer 600B including preheating subsystem 678 in accordance with the present teachings. Preheat can be applied anywhere along feed tube 672 to a temperature at or above the glass transition temperature of the polymer feed (but less than the melting point). Preheating subsystem 678 can be embodied in a variety of forms, including, without limitation, a direct contact heater (as in system 100A of FIG. 2) or a hot-air blower (as in system 100B of FIG. 3). Other embodiments of preheating subsystem 678, as will occur to those skilled in the art in light of the present teachings and as is suitable for a material-extrusion-based 3D printer may suitably be used.

FIG. 7A depicts a side view of a portion of a conventional directed energy deposition 3D printer 700A. A laser (not depicted), generates beam 780, feed lines 782 deliver powder feed 784, and shield gas lines 786 deliver shield gas 788 to build surface 790. Energy (e.g., laser light, etc.) is directed to a narrow, focused region on substrate 792, melting the substrate and the powdered feed material 784 that is being deposited into the substrate's melt pool.

FIG. 7B depicts a modified directed energy deposition 3D printer 700B including preheating subsystem 794 in accordance with the present teachings. (In printer 700B, the shield-gas line on the right of FIG. 7B is omitted for clarity.) Preheat can be applied anywhere along feed lines 782 to preheat the feed to a temperature at or above the glass transition temperature of the polymer feed (but less than the melting point). Preheating subsystem 794 can be embodied in a variety of forms, including, without limitation, a direct contact heater (as in system 100A of FIG. 2) or a hot-air blower (as in system 100B of FIG. 3). Other embodiments of preheating subsystem 794, as will occur to those skilled in the art in light of the present teachings and as is suitable for a material-extrusion-based 3D printer may suitably be used.

It is to be understood that the disclosure describes a few embodiments and that many variations of the invention can easily be devised by those skilled in the art after reading this disclosure and that the scope of the present invention is to be determined by the following claims.

What is claimed is:
1. A method for additive manufacturing, the method comprising:

(a) delivering, by a feed motor, a filament comprising a polymer to a first zone, wherein the feed motor draws the filament;

(b) preheating, by a first light beam and at the first zone, the filament to a preheat temperature that is (i) in excess of a glass transition temperature of the polymer, (ii) less than a melting point of the polymer, and (iii) dependent on stiffness of the polymer at the glass transition temperature of the polymer, to provide a pre-heated filament, wherein the filament is preheated, by the first light beam and at the first zone, from a temperature that is less than the glass transition temperature of the polymer;

(c) depositing the pre-heated filament adjacent to a build surface to form a deposited filament; and (d) melting, by a second light beam, the deposited filament to provide a melted filament, wherein the second light beam is different from the first light beam.

2. The method of claim 1, wherein the preheat temperature is in a range of 0.7 to 0.95 times the melting point of the polymer.

3. The method of claim 1, wherein the preheat temperature is in a range of 0.8 to 0.9 times the melting point of the polymer.

4. The method of claim 1, wherein the preheating occurs in a first period of time and the melting occurs in a second period of time, and wherein the first period of time is longer than the second period of time.

5. The method of claim 1, wherein a heating rate at which the deposited filament is heated in (d) is greater than a heating rate at which the filament is heated in (b).

6. The method of claim 1, wherein the polymer is a semi-crystalline polymer.

7. The method of claim 1, wherein the first light beam is provided by a first device and the second light beam is provided by a second device.

8. The method of claim 1, further comprising, prior to (b), splitting, by a beam splitter, a light beam from a light source into the first light beam and the second light beam.

9. The method of claim 1, wherein the first light beam has a different intensity than the second light beam.

10. The method of claim 1, further comprising:
    delivering the preheated filament to underneath a roller and adjacent to the build surface; and
    altering, by the roller, a cross section of the deposited filament from circular to rectangular.

11. The method of claim 1, wherein the filament comprises continuous fiber impregnated with the polymer.

12. The method of claim 1, further comprising sizing, by a cutter, the filament prior to the depositing.

13. The method of claim 1, wherein the filament maintains a cylindrical shape between the feed motor and the first zone.

14. The method of claim 1, wherein the delivering of the filament to the first zone comprises drawing, by the feed motor, the filament from a spool.

* * * * *